United States Patent [19]
Okada et al.

[11] Patent Number: 5,854,799
[45] Date of Patent: Dec. 29, 1998

[54] VIDEO DECODER WITH FUNCTIONS TO DETECT AND PROCESS ERRORS IN ENCODED VIDEO DATA

[75] Inventors: Shigeyuki Okada, Hashima; Naoki Tanahashi, Gifu; Hayato Nakashima, Gifu-ken, all of Japan

[73] Assignee: Sanyo Electric Co., Ltd., Osaka, Japan

[21] Appl. No.: 564,478

[22] Filed: Nov. 29, 1995

[30] Foreign Application Priority Data

Nov. 29, 1994 [JP] Japan ...................................... 6-295018
Nov. 15, 1995 [JP] Japan ...................................... 7-297122

[51] Int. Cl.$^6$ ................................................. H03M 13/00
[52] U.S. Cl. ........................................... 371/37.1; 395/173
[58] Field of Search ......................... 371/37.1; 378/98.5; 463/1, 43; 358/539; 348/239, 578; 469/474; 345/122; 395/173; 380/20

[56] References Cited

U.S. PATENT DOCUMENTS

| | | |
|---|---|---|
| 5,243,428 | 9/1993 | Challapali et al. ..................... 348/607 |
| 5,377,266 | 12/1994 | Katta et al. ............................... 380/20 |
| 5,636,279 | 6/1997 | Katta et al. ............................... 380/20 |

*Primary Examiner*—Reba I. Elmore
*Assistant Examiner*—McDiennel Marc
*Attorney, Agent, or Firm*—Sheridan Ross P.C.

[57] ABSTRACT

A video decoding apparatus for decoding encoded video data to continuously produce decoded pictures. The video data includes a series of pictures, each picture contains a series of slices, and each slice contains a series of macroblocks. A dequantizer performs dequantization of the video data based upon a quantization threshold value. A motion-vector restoring circuit restores data for each macroblock. A direct current error detector is provided to detect erroneous macroblocks based upon the dequantized data. A motion-area error detector is provided to detect erroneous macroblocks based upon the restored motion vector data. An erroneous macroblock is replaced by a corresponding macroblock from a preceding picture. Subsequent macroblocks in a slice may also be replaced by corresponding macroblocks from a preceding picture.

23 Claims, 13 Drawing Sheets

huffman table
11:A
10:B
01:C
001:D
0001:E
other:NG (a): [0001 001 01 10 10 01......]
       E    D   C  B  B  C (b): [0001 10 10 11 01 001......]
       E    B  B  A  C  D

VIDEO DECODER WITH FUNCTIONS TO DETECT AND PROCESS ERRORS IN ENCODED VIDEO DATA

BACKGROUND OF THE INVENTION

1. Field of the Invention

The present invention relates generally to a decoder which decodes encoded video data. More particularly, the invention relates to a video decoder that functions to detect and process errors in encoded video data when decoding the encoded video data.

2. Description of the Related Art

Personal computers, as well as business and home entertainment systems, handle a vast amount of and multifarious types and forms of multimedia information, should be able to process digitally recorded video and audio information at a fast speed. Such fast information processing can be achieved by data compression and expansion techniques. The "MPEG" (Moving Picture Experts Group) standards define a popular type of data compression and expansion technique which improves the processing speed. Current MPEG standards are undergoing standardization by the MPEG Committee (ISO/IEC JTC1/SC29/WG11) under the ISO/IEC (International Organization for Standardization)/ (International Electrotechnical Commission).

The MPEG standards consist of three parts. Part 1 (ISO/IEC IS 11172-1: MPEG system part) defines the multiplex structure of video data and audio data and the synchronization system. Part 2 (ISO/IEC IS 11172-2: MPEG video part) defines the high efficiency coding system for video data and the format for video data. Part 3 (ISO/IEC IS 11172-3: MPEG audio part) defines the high efficiency coding system for audio data and the format for audio data.

MPEG video part handles video data associated with moving pictures, each moving picture consisting of several tens of (e.g., 30) frames per second. The video data sequence has a six-layer structure including a plurality of Groups Of Pictures (GOP), each GOP including a plurality of pictures, with a plurality of slices in each picture, a plurality of macroblocks in each slice and a plurality of blocks in each macroblock. Each picture can be associated with a frame or two fields. The number of slices included in a single picture is not constant and neither is the number of macroblocks included in a single slice.

In MPEG, a compression technique called intra-frame prediction coding is employed. Intra-frame prediction coding compresses intra-frame data based on a chronological correlation among frames. Intra-frame prediction includes bidirectional prediction. Bidirectional prediction uses both forward prediction for predicting a current reproduced image (or picture) from an old reproduced image (or picture) and backward prediction for predicting a current reproduced image from a future reproduced image. Bidirectional prediction coding uses Intra-coded pictures (I-pictures), Predictive-coded pictures (P-pictures) and Bidirectionally-coded pictures (B-pictures).

An I-picture is produced independently irrespective of old and future reproduced images (pictures). That is, an I-picture is produced without using old or future pictures. A P-picture is produced by forward prediction (prediction from an old decoded I- or P-picture). That is, a P-picture cannot be produced without an old picture. A B-picture is produced by bidirectional prediction. In bidirectional prediction, a B-picture is produced by one of the following three prediction techniques.

(1) Forward Prediction: prediction from an old decoded I- or P-picture.

(2) Backward Prediction: prediction from a future decoded I- or P-picture.

(3) Bidirectional Prediction: prediction from old and future decoded I- or P-pictures.

It should be apparent that every B-picture is produced by referring to an old or a future picture. That is, a B-picture cannot be produced without an old or a future picture.

In intra-frame prediction, an I-picture is typically produced first. Next, a frame several frames ahead of the I-picture is produced as a P-picture. This P-picture is produced by prediction in one direction from the past to the present (forward direction). Next, a frame located before the I-picture and after the P-picture is produced as a B-picture. At the time this B-picture is produced, the optimal prediction scheme is selected from among forward prediction, backward prediction and bidirectional prediction.

In general, a current image and its preceding and succeeding images are similar to one another in that they differ only partially (e.g., motion picture images). In this respect, it is assumed that the previous frame (e.g., I-picture) and the next frame (e.g., P-picture) are substantially the same. If there is a slight difference (B-picture data) between both frames, this difference is extracted and compressed. Accordingly, the intra-frame data can be compressed based upon the chronological correlation among consecutive frames. A stream of video data encoded according to the MPEG video part in the above manner is called an MPEG video bit stream (hereinafter called simply a "video stream").

At present there are two MPEG standards, MPEG-1 and MPEG-2, 2, which basically differ in the rate at which video and audio data are encoded. MPEG-1 is mainly associated with storage media such as a video CD (Compact Disc) or a CD-ROM (Compact Disc-Read Only Memory), while MPEG-2 is associated with general transmission media. This general transmission media include a communications medium like a LAN (Local Area Network), broadcasting media like ground broadcasting, satellite broadcasting and CATV (Community Antenna Television), in addition to recording media (or storage media) like a video CD, a CD-ROM, a DVD (Digital Video Disk) or a VTR (Video Tape Recorder).

FIG. 1 is a block circuit diagram illustrating a conventional MPEG video decoder 101. The MPEG video decoder 101 comprises a bit buffer 102, a frame buffer 103, a picture header detector 104, a slice header detector 105, a variable length decoder 106, a dequantizer 107, an inverse discrete cosine transform (IDCT) circuit 108, a motion compensated prediction (MC) circuit 109, first and second ROMs (Read Only Memories) 110 and 111, a control core circuit 112 and a Huffman error detector 113. The frame buffer 103 shares one RAM with the bit buffer 102, and has three storage areas: a forward reference area 103a, a backward reference area 103b and a B-picture storage area 103c. The MC circuit 109 has a motion-vector restoring circuit 114. The control core circuit 112 controls the individual circuits 102 to 111 and 113.

The bit buffer 102 receives and stores a video stream, which has been transferred from a transmission medium 120. The picture header detector 104 detects a picture header affixed at the head of each picture included in the video stream that is stored in the bit buffer 102, and determines the type of each picture (I, P or B). Based on the decision, the control core circuit 112 reads a video stream for one picture from the bit buffer 102 every one frame period. The slice header detector 105 detects a slice header affixed at the head of each slice included in the video stream.

The variable length decoder 106 receives a video stream as a stream of compressed video data from transmission medium 120 and performs variable length decoding on a video stream picture by picture based on Huffman codes stored in a Huffman table provided in the first ROM 110. The dequantizer 107 performs dequantization on the variable-length decoded data based on quantization threshold values stored in a quantization table, stored in the second ROM 111, to attain DCT (Discrete Cosine Transform) coefficients. The IDCT circuit 108 performs IDCT(Inverse Discrete Cosine Transform) to convert the DCT coefficients.

The MC circuit 109 performs motion compensated prediction (MC) based on the processing results (e.g. macroblock data, macroblock type and prediction error) from the IDCT circuit 108. The motion-vector restoring circuit 114 restores the motion vectors based on the processing results (prediction error) from the IDCT circuit 108. The processing results (each decoded macroblock) from the MC circuit 109 are selectively stored in one of the areas 103*a* to 103*c* of the frame buffer 103. The MPEG video decoder 101 supplies the decoded data of pictures stored in one of the areas 103*a*–103*c* via the MC circuit 109 to a display 121 as a video signal.

The Huffman error detector 113 monitors the decoding process of the variable length decoder 106 and detects errors in a video stream slice by slice. When there is no data corresponding to a slice in the Huffman table and/or when data corresponding to a slice does not match with old decoded data, it is determined that an error is present in that slice.

When such an error occurs, the control core circuit 112 performs the following three steps:

(1) Stops the decoding process of the variable length decoder 106 with respect to the first slice that has been determined to contain an error and invalidates the results of the decoding of the erroneous first slice.

(2) Reads the second slice to be decoded following the erroneous first slice from the bit buffer 102 based upon the detected slice header and causes the variable length decoder 106 to perform variable length decoding on the second slice.

(3) Directs the MC circuit 109 and the frame buffer 103 to replace the first slice to be stored in the frame buffer 103 with the third slice from an adjacent picture. This adjacent picture precedes by one the picture that includes the erroneous first slice. This third slice now corresponds to the first slice in the video stream. Thus, what is output to the display 121 is the decoded data of the third slice, not the decoded data of the first slice which contains the error. The error in the slice is therefore disguised. Currently, it would be desirable to enhance the error resistance in MPEG video decoders by executing high-precision error detection and error processing.

SUMMARY OF THE INVENTION

Accordingly, the present invention provides a video decoder capable of executing error detection and error processing with high precision.

In one aspect of the invention, a dequantizer is provided which performs dequantization on video data to produce dequantized data based upon a quantization threshold value. Based upon the dequantized data, a direct current error detector checks macroblocks by macroblock to determine if an erroneous macroblock exists. Each slice of a picture is checked. If an erroneous macroblock is found, an error processing circuit replaces the erroneous macroblock with a corresponding macroblock from a preceding picture. In this aspect, each of the macroblocks following the erroneous macroblock in a given slice may also be replaced by corresponding macroblocks of a preceding picture. Also, the direct current error detector may determine than an erroneous macroblock exists if a discrete cosine coefficient associated with the macroblock lies outside of a predetermined range.

In another aspect of the invention, a motion-vector restoring circuit is provided for restoring data of a motion vector for each macroblock. Based upon the restored motion vector data, a motion area error detector determines macroblock by macroblock if a slice contains an erroneous macroblock. If an erroneous macroblock is found, an error processing circuit replaces the erroneous macroblock with a corresponding macroblock from a preceding picture. In this aspect, each of the macroblocks following the erroneous macroblock in a given slice may also be replaced by corresponding macroblocks of a preceding picture. Also, the motion area error detector may determine that an erroneous macroblock exists if a restored motion vector indicates a point outside of a picture.

In yet anther aspect of the invention, a slice header detector is provided for detecting a slice header for each slice. A variable-length decoder performs decoding on the video data based upon Huffman codes. A dequantizer is provided which performs dequantization on the video data based upon a quantization threshold value. An inverse discrete cosine transform (IDCT) circuit is provided for processing the data from the dequantizer. A motion compensated prediction circuit is provided to perform prediction upon the data from the IDCT circuit. A frame buffer is provided for storing decoded pictures which are used by the motion compensated prediction circuit. Based upon the dequantized data, an error detector checks macroblock by macroblock to determine if an erroneous macroblock exists. If an erroneous macroblock is found, an error processing circuit replaces the erroneous macroblock with a corresponding macroblock from a preceding picture. The error detector may also determine than an erroneous macroblock exists if a restored motion vector indicates a point outside of a picture.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention, together with advantages thereof, may best be understood by reference to the following description taken in conjunction with the accompanying drawings in which:

FIG. 12 is a diagram showing the relationship between a video stream and Huffman codes.

DETAILED DESCRIPTION OF THE PREFERRED EMBODIMENT

Figure 1:
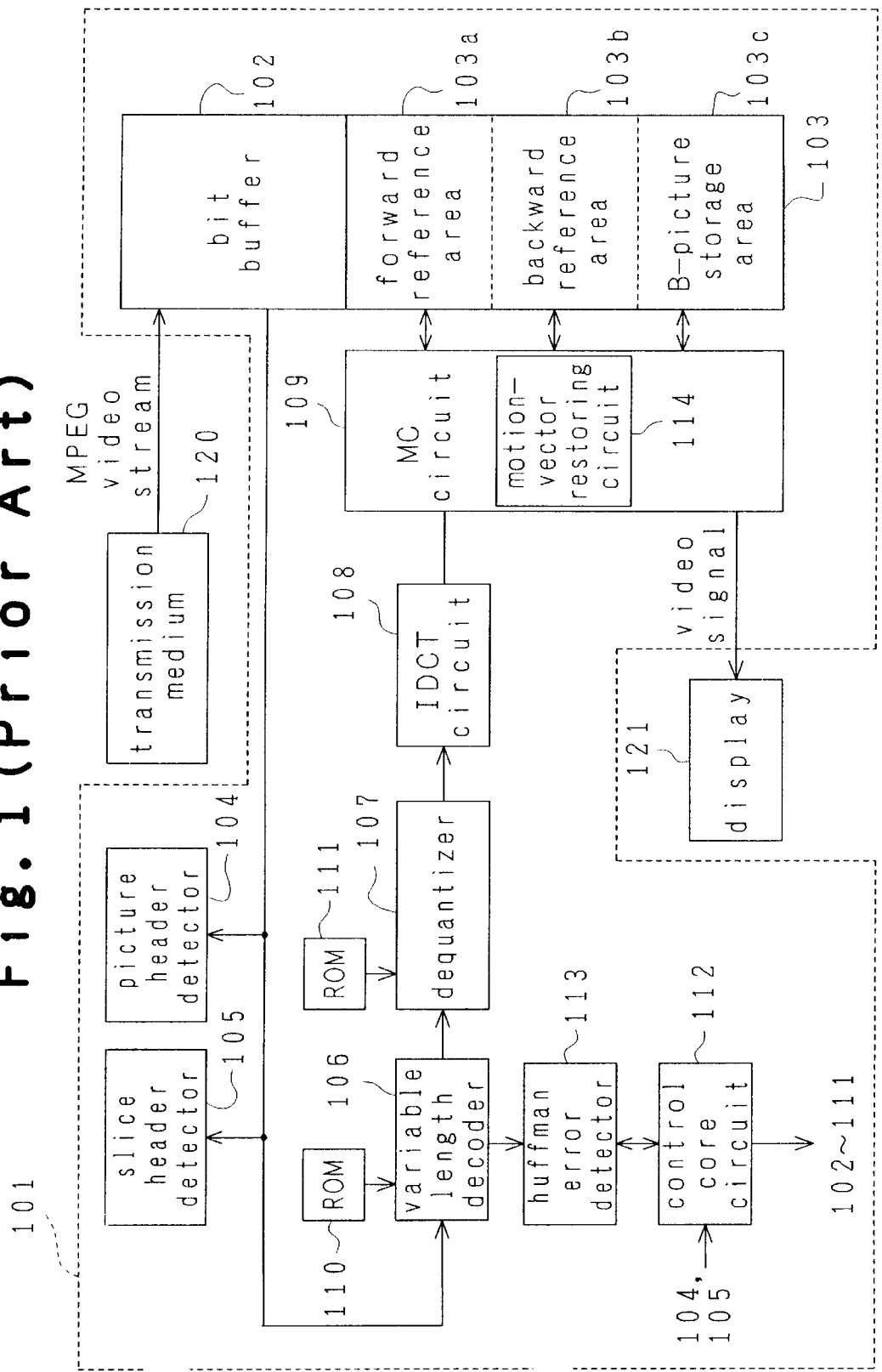
FIG. 1 is a block circuit diagram showing a conventional MPEG video decoder.
Figure 2:
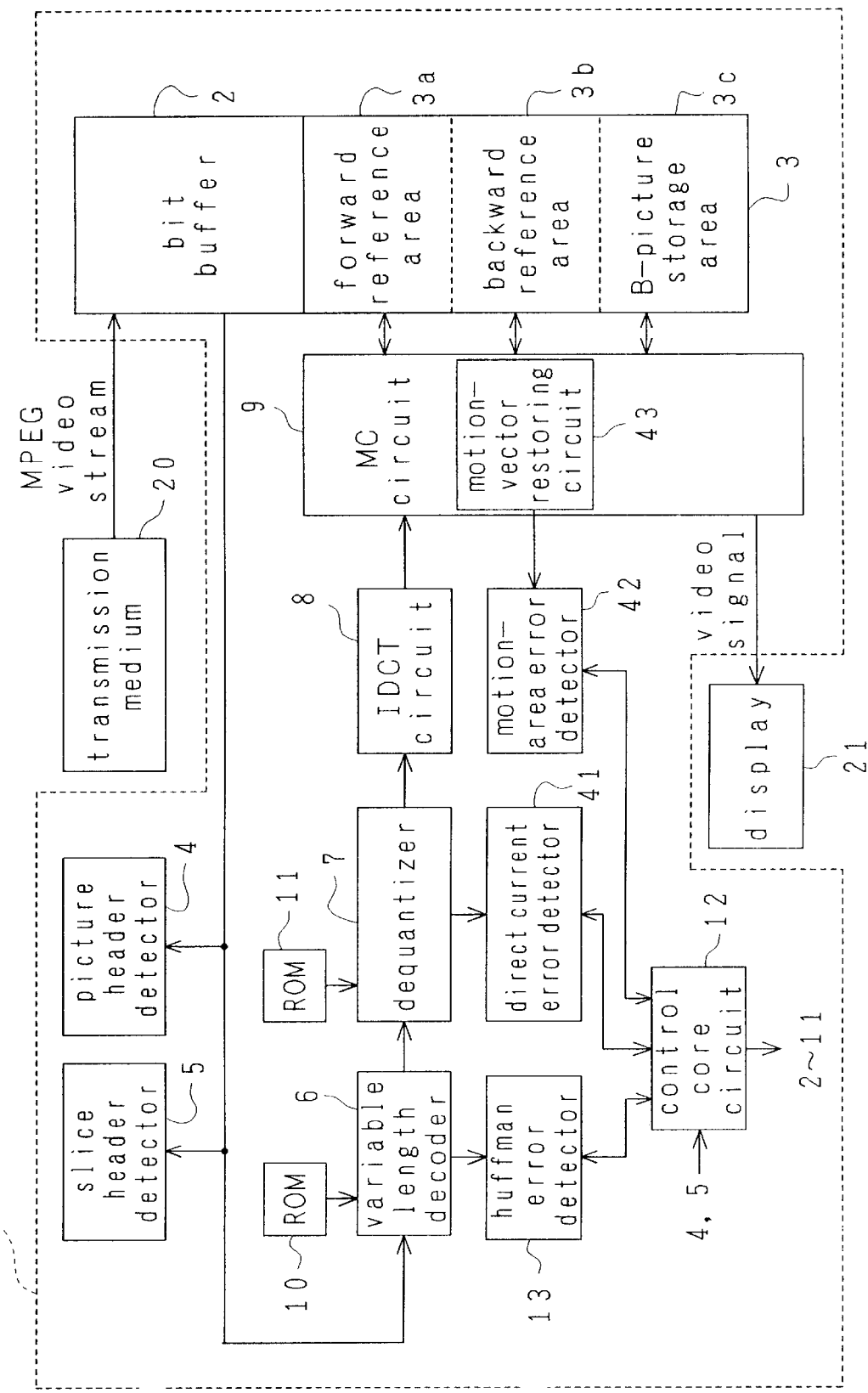
FIG. 2 is a block circuit diagram showing a video decoder according to one embodiment of this invention.

An MPEG video decoder according to one embodiment of the present invention will now be described with reference to the accompanying drawings. FIG. 2 is a block circuit diagram illustrating an MPEG video decoder 1 according to this embodiment. The MPEG video decoder 1 comprises a bit buffer 2, a frame buffer 3, a picture header detector 4, a slice header detector 5, a variable length decoder 6, a dequantizer (or inverse quantizer) 7, an inverse discrete cosine transform (IDCT) circuit 8, a motion compensated prediction (MC) circuit 9, first and second ROMs 10 and 11, a control core circuit 12, a Huffman error detector 13, a direct current error detector 41 and a motion-area error detector 42. The individual circuits 4 to 13, 41 and 42 are mounted on a single large-scale integration semiconductor chip. The frame buffer 3 shares one RAM with the bit buffer 2, and has three storage areas: a forward reference area 3a, a backward reference area 3b and a B-picture storage area 3c. This structure contributes to the reduction of the number of components, thus reducing the cost of the components of the MPEG video decoder 1. The MC circuit 9 has a motion-vector restoring circuit 43.

The control core circuit 12 controls the individual circuits 2 to 11, 13, 41 and 42. A video stream, which has been transferred from a transmission medium 20, is supplied to the bit buffer 2. The bit buffer 2 is a ring buffer constituted of a RAM (Random Access Memory) which has FIFO (First-In-First-Out) structure, and sequentially stores a video stream sent from the transmission medium 20. The transmission medium 20 includes a storage medium like such as video CD, CD-ROM, DVD or VTR, a communications medium such as a LAN (Local Area Network), and a broadcasting medium like ground broadcasting, satellite broadcasting or CATV.

The bit buffer 2 operates to temporarily store I-, P- and B-pictures which differ from one another in the amount of data. The amount of data of an I-picture is about 30 Kbytes, the amount of data of a P-picture is about 10 to 15 Kbytes, and the amount of data of a B-picture ranges from 0 to about 6 Kbytes. The bit rate of a video stream transferred from the transmission medium 20 is constant. Because the individual circuits 6 to 9 perform processes picture by picture as described later, the processing times vary depending on the amounts of data of the pictures. If a video stream is transferred directly to the individual circuits 6–9, there may be some pictures that those circuits 6–9 cannot process. Because the bit buffer 2 serves as a buffer memory to store a video stream, the individual circuits 6–9 can perform their processes in accordance with the different amounts of data of the individual I-, P- and B-pictures.

The picture header detector 4 detects a picture header affixed at the head of each picture included in a video stream and determines the type of that picture (I, P or B) defined in the picture header. The slice header detector 5 detects a slice header affixed at the head of each slice in a video stream. Based on the detection result from the picture header detector 4, the control core circuit 12 reads a video stream for one picture from the bit buffer 2 every frame period.

The variable length decoder 6 receives a video stream as a stream of compressed video data from transmission medium 20 and performs variable length decoding on a video stream picture by picture based on Huffman codes in a Huffman table stored in the first ROM 10. The inverse quantizer 7 performs inverse quantization on the variable-length decoded data based on quantization threshold values in a quantization table, stored in the second ROM 11, to obtain DCT (Discrete Cosine Transform) coefficient data. The IDCT circuit 8 performs IDCT to convert the DCT coefficients.

The MC circuit 9 performs motion compensated prediction (MC) based on the processing results (e.g., macroblock data, macroblock type and prediction error) from the IDCT circuit 8. The motion-vector restoring circuit 43 restores the motion vectors based on the processing results (prediction error) from the IDCT circuit 8. The processing results (each decoded macroblock) from the MC circuit 9 are selectively stored in the areas 3a to 3c of the frame buffer 3. A future decoded I-picture or P-picture is stored in the forward reference area 3a in order for the MC circuit 9 to execute backward prediction. An old decoded I-picture or P-picture is stored in the backward reference area 3b in order for the MC circuit 9 to execute forward prediction. A decoded B-picture is stored in the B-picture storage area 3c. The MPEG video decoder 1 supplies decoded data of a picture stored in one of the areas 3a–3c via the MC circuit 9 to a display 21, as a video signal.

Since an I-picture or P-picture to be stored in the forward reference area 3a or the backward reference area 3b are used as data based upon which forward prediction or backward prediction is to be performed, this I- or P-picture is stored in area 3a or 3b until it becomes unnecessary. A B-picture to be stored in the B-picture storage area 3c is not used as reference data; it becomes unnecessary after being output to the display 21. The individual areas 3a to 3c are called planes.

Figure 3:
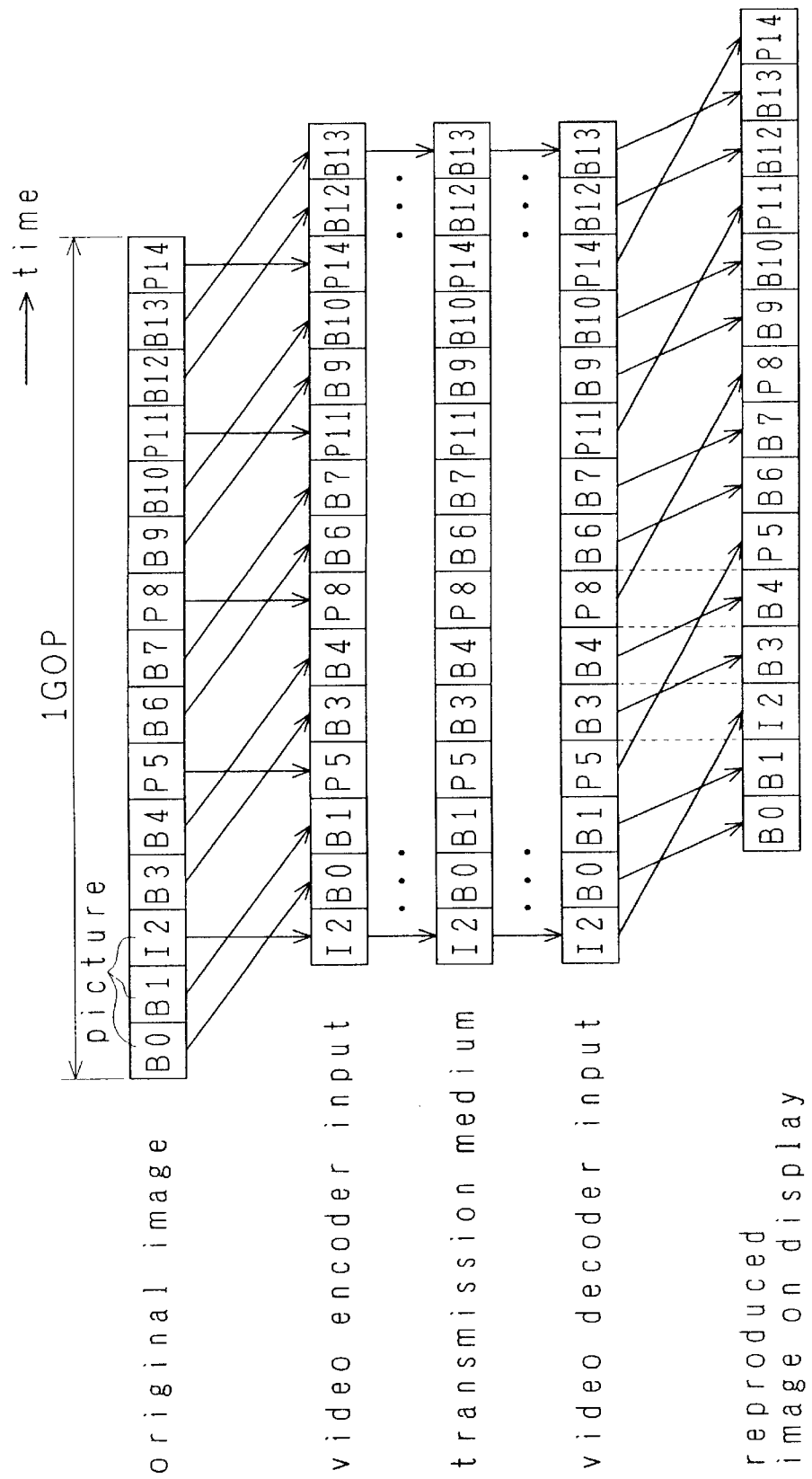
FIG. 3 is a diagram showing the alignment of pictures in the encoding and decoding processes.

An MPEG video encoder performs encoding by rearranging the individual pictures of an original image in a different order as shown in FIG. 3. The transmission medium 20 transmits the individual pictures in the rearranged order. The MPEG video decoder 1 rearranges the individual pictures in such an order so that the order of the pictures of a reproduced image on the display 21 is the same as that of the original image. In this rearrangement of the pictures, the frame buffer 3 is used.

While the decoded data of a B-picture B3 is being transferred to the B-picture storage area 3c, the decoded data of an I-picture I2 stored in the backward reference area 3b is output to the display 21. While the decoded data of a B-picture B4 is being transferred to the B-picture storage area 3c, a B-picture B3 stored in the B-picture storage area 3c is output to the display 21. Therefore, the data of the B-picture B3 is overwritten with the data of the B-picture B4. While the decoded data of a P-picture P8 is being transferred to the backward reference area 3b, the B-picture B4 stored in the B-picture storage area 3c is output to the display 21.

The Huffman error detector 13 monitors the decoding process of the variable length decoder 6 and detects errors in a video stream slice by slice. When there is no data corresponding to a slice in the Huffman table and/or when data corresponding to a slice does not match with old decoded data, it is determined that an error is present in that slice.

Based on that decision, the control core circuit 12 executes the following error processing steps. The following description will be given of the case where a slice S1 having n macroblocks MB1 to MBn contains an error in the data structure of a video stream shown in FIG. 4. In the diagram, blocks within a macroblock are omitted.

Step A-(1): The variable length decoder 6 stops decoding slice S1 that contains an error, and the results of decoding slice S1 are invalidated.

Step A-(2): Based upon the detected slice header, the next slice S2 is read from the bit buffer 2 and the variable length decoder 6 performs variable length decoding on slice S2.

Step A-(3): The MC circuit 9 and frame buffer 3 are directed to replace slice S1 to be stored in the frame buffer 3 with a slice from an adjacent picture. This adjacent picture precedes by one the picture that includes slice S1. Macroblocks MB1' to MBn' of slice of adjacent picture correspond to macroblocks MB1 to MBn of slice S1.

The reason why slice S1 which contains an error is replaced with the associated macroblocks MB1'–MBn' is because slice S1 and macroblocks MB1'–MBn' are very likely to have substantially the same data contents. In a stream of pictures consecutively output to the display 21, pictures previous to and subsequent to given picture are similar to the given picture and differ only slightly. Accordingly, errors can be disguised in most cases. Step A-(3) will now be explained with reference to the following cases in which either one of B-pictures B3, B4 or P-picture P5 contains slice S1. FIG. 3 illustrates the order in which those pictures are to be decoded. A picture that precedes another is a picture that would be output earlier to the display 21.

Figure 5:
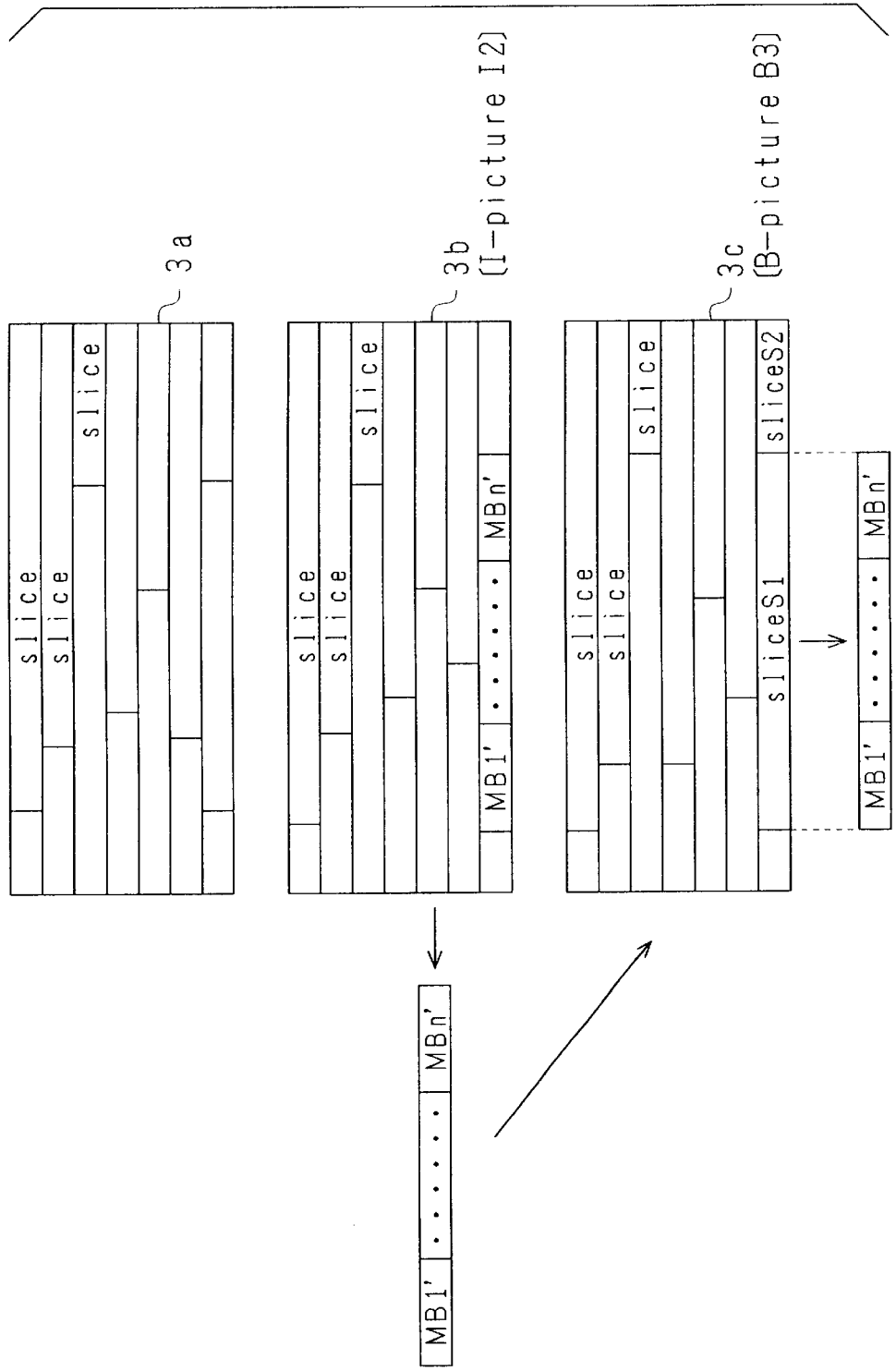
FIGS. 5 through 7 are diagrams showing the process performed at the time the Huffman error is detected.

Case A1 (B-picture B3): A picture that precedes by one the B-picture B3 is an I-picture I2 stored in the backward reference area 3b. The B-picture B3 is transferred to the B-picture storage area 3c. As shown in FIG. 5, macroblocks MB1' to MBn' of the I-picture I2 corresponding to slice S1 of the B-picture B3 are read from the area 3b. Macroblocks MB1' to MBn' are then written to the area 3c, so that slice S1 of the B-picture B3 is replaced with macroblocks MB1' to MBn'.

Figure 6:
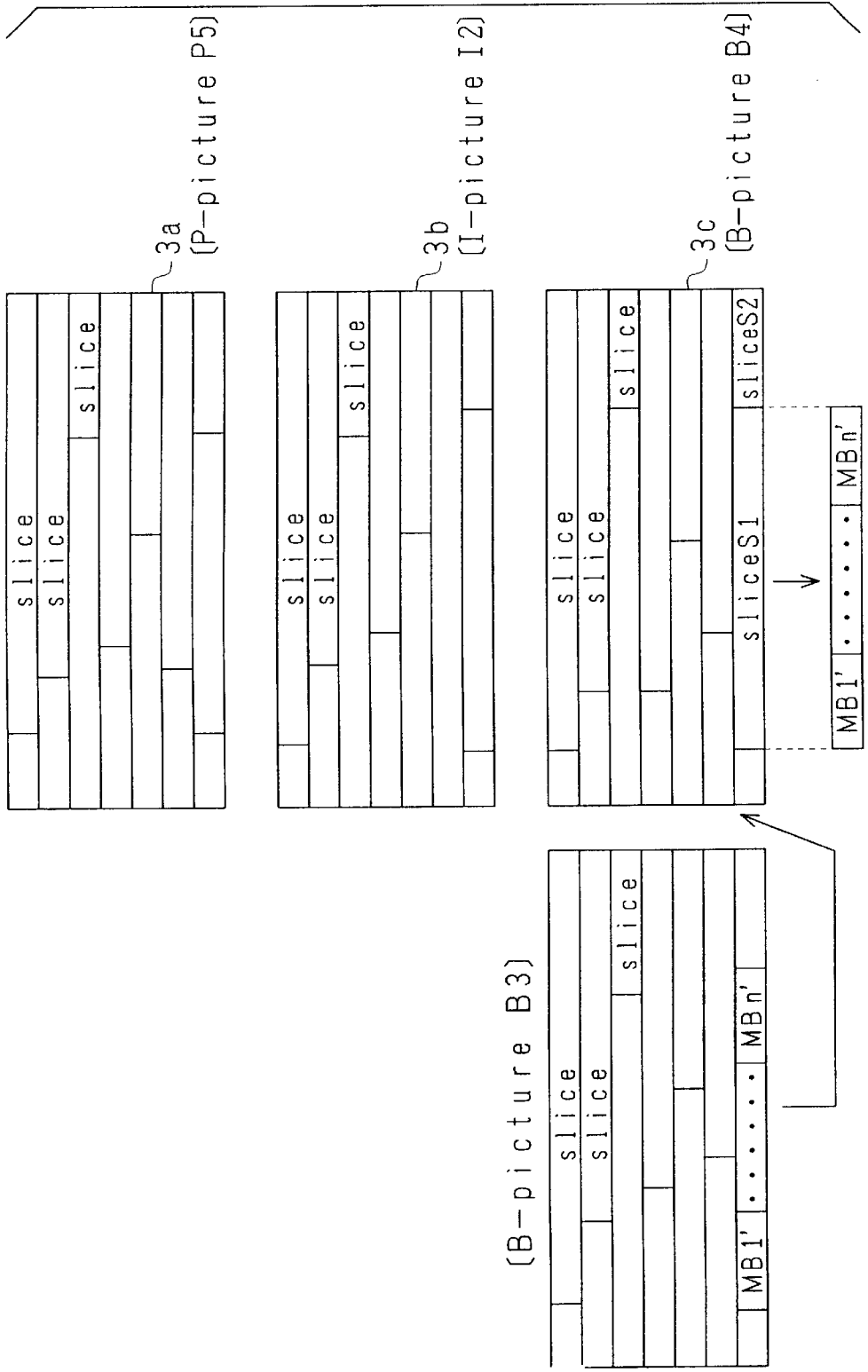

Case A2 (B-picture B4): A picture that precedes by one the B-picture B4 is the B-picture B3 which had previously been stored in the B-picture storage area 3c. Subsequently, however, the B-picture B4 is transferred to the area 3c. As shown in FIG. 6, macroblocks MB1' to MBn' of the B-picture B3 corresponding to slice S1 of the B-picture B4 are not overwritten with the data of the B-picture B4 but remain intact in the area 3c. As a result, slice S1 is effectively replaced with macroblocks MB1' to MBn'.

Figure 7:
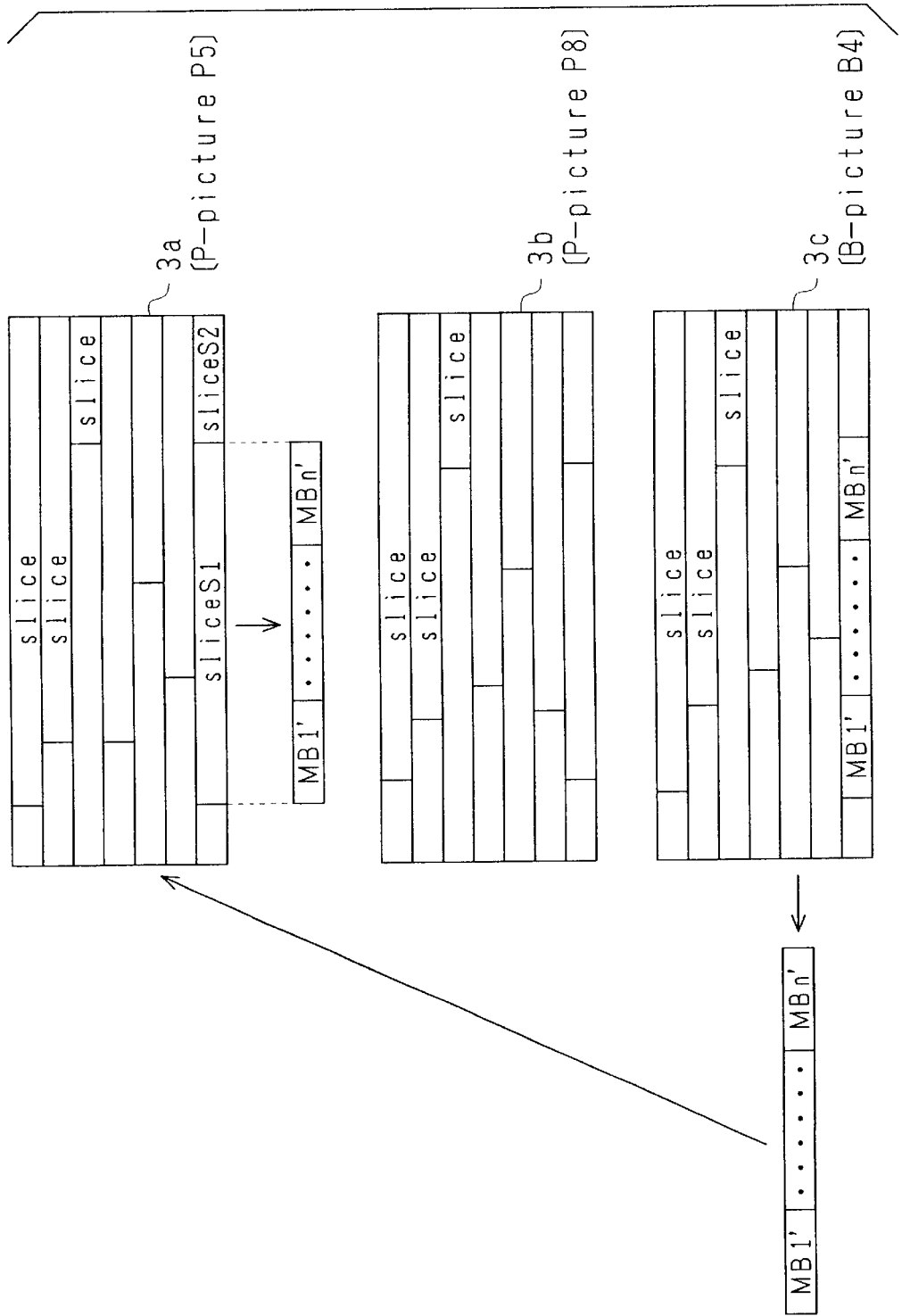

Case A3 (P-picture P5): A picture that precedes by one the P-picture P5 is the B-picture B4 stored in the B-picture storage area 3c. The P-picture P5 is stored in the forward reference area 3a. As shown in FIG. 7, macroblocks MB1' to MBn' of the B-picture B4 corresponding to slice S1 of the P-picture P5 are read from area 3c. Macroblocks MB1' to MBn' are then written to the area 3a, so that slice S1 is replaced with macroblocks MB1' to MBn'.

The direct current error detector 41 monitors the inverse quantization process performed by the inverse quantizer 7 to detect errors macroblock by macroblock. More specifically, the direct current error detector 41 detects if a direct current coefficient included in the DCT coefficient data computed by the inverse quantizer 7 falls within a predetermined value for each macroblock. If the direct current coefficient does not lie within a predetermined value, it is determined that this macroblock contains an error. The direct current coefficient is a (0, 0) component included in the DCT coefficient data.

Figure 8:
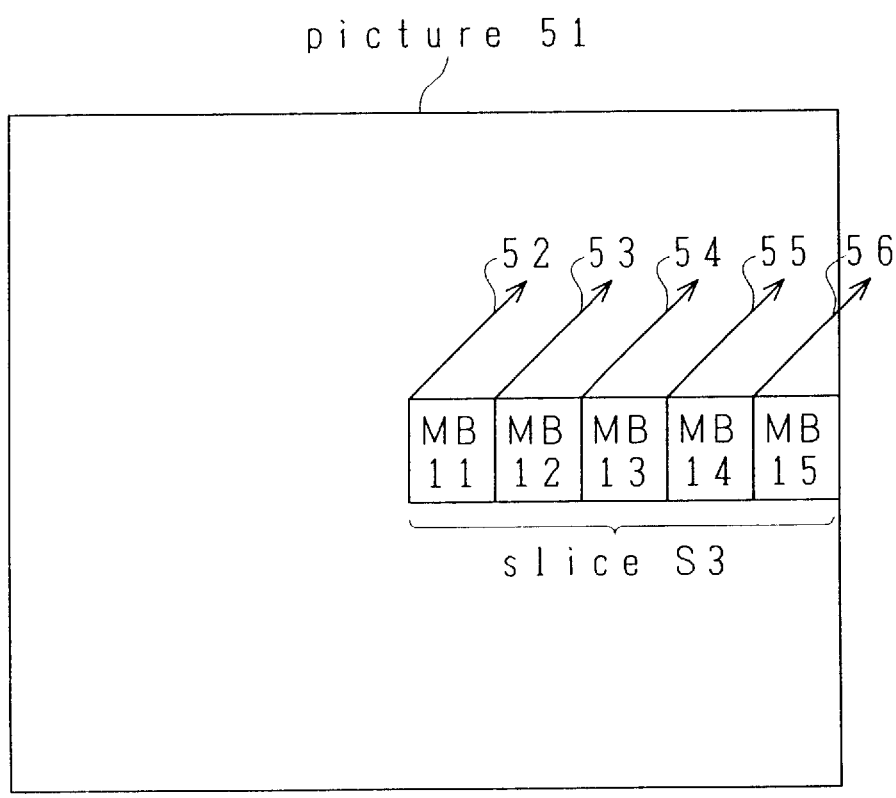
FIG. 8 is a diagram showing restored motion vectors for individual macroblocks.

The motion-area error detector 42 monitors the motion vectors that have been restored by the motion-vector restoring circuit 43 in order to detect errors macroblock by macroblock. For example, the motion-vector restoring circuit 43 restores motion vectors 52 to 56 for each of macroblocks MB11 to MB15 of slice S3 included in a picture 51, as shown in FIG. 8. The motion-area error detector 42 detects if the motion vectors 52–56 indicate a point in the picture 51. If one of the motion vectors 52–56 indicates a point outside of the picture 51, it is determined that an error is contained in macroblock corresponding to that motion vector. In FIG. 8, for example, while the motion vectors 52–55 indicate points inside the picture 51, the motion vector 56 indicates a point outside the picture 51. It is therefore determined that an error is present in macroblock MB15 corresponding to the motion vector 56.

The following are possible causes of errors detected by the direct current error detector 41 or the motion-area error detector 42.

(1) The case where a video stream transferred from the transmission medium 20 is not encoded according to the MPEG video standards.

(2) The case where an arbitrary bit in a video stream transferred from the transmission medium 20 is in error due to some problem with the transmission medium 20. For example, an arbitrary bit in a video stream transferred from the transmission medium 20 may be in error due to scratches on a video CD or a DVD, or due to noise in a communications medium or broadcasting medium. According to this embodiment, the direct current error detection and motion-area error detection as well as the Huffman error detection are designed so that the precision of the error detection can be improved and the error resistance can be enhanced.

Figure 4:
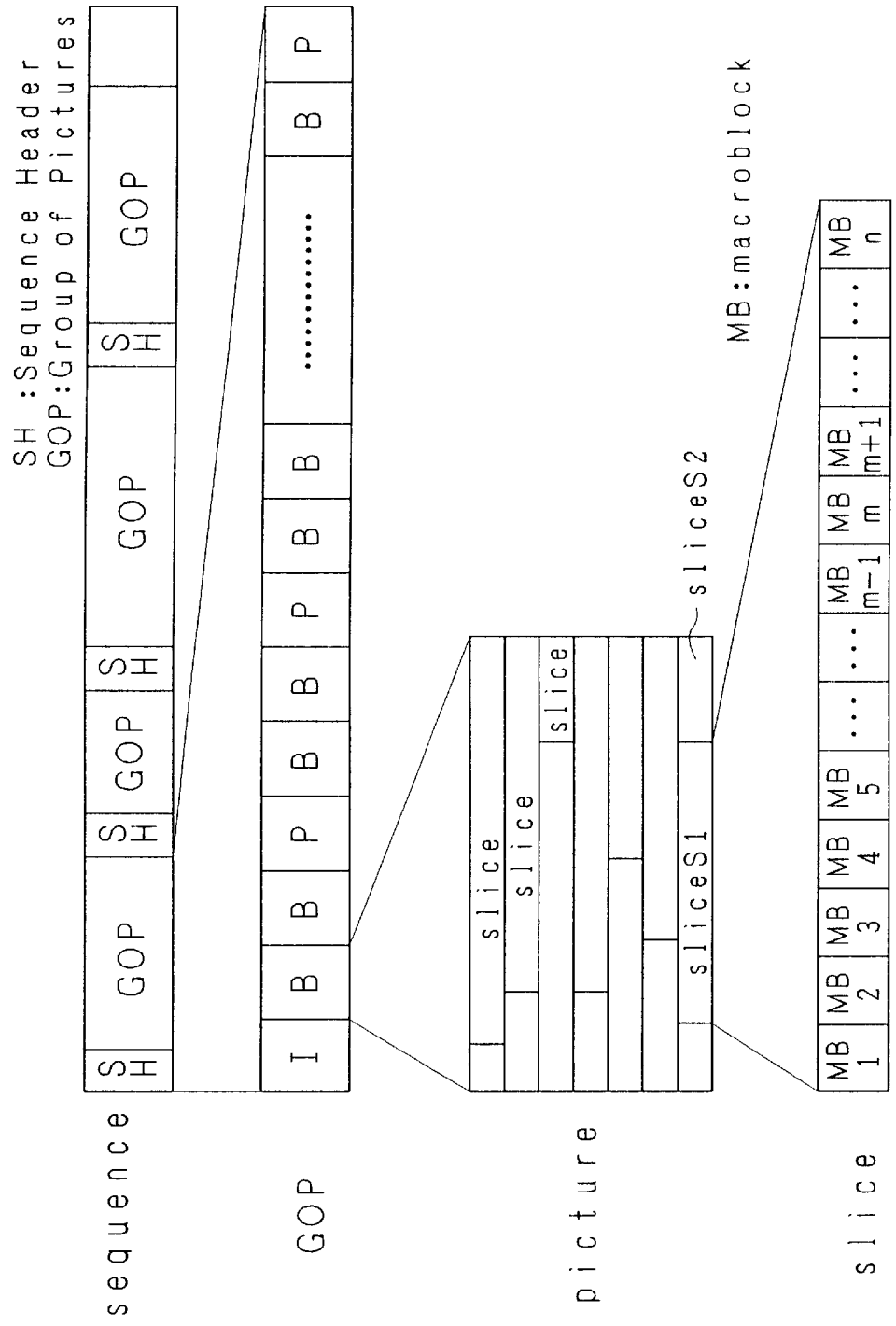
FIG. 4 is a diagram showing the data structure of a video stream.

When the detector 41 or 42 determines that an error is present in a macroblock, the control core circuit 12 performs the following error processing steps. The following description describes the case where macroblock MBm in slice S1 contains an error. FIG. 4 shows a representation of the data structure for this video stream.

Step B-(1): The circuits 6 to 8 cease processing macroblocks MBm to MBn, and the results of processing each of macroblocks MBm–MBn is invalidated.

Step B-(2): The next slice S2 is read from the bit buffer 2 based upon the detected slice header, and the individual circuits 6 to 8 are allowed to process slice S2.

Step B-(3): The MC circuit 9 and frame buffer 3 are directed to replace macroblocks MBm to MBn to be stored in the frame buffer 3 with macroblocks MBm' to MBn' of an adjacent picture. This adjacent picture precedes by one the picture that includes macroblocks MBm–MBn. Those macroblocks MBm, to MBn' correspond to macroblocks MBm to MBn. Macroblocks MBm'–MBn' and macroblocks MBm–MBn are very likely to have substantially the same data contents. Therefore, errors can be disguised in most cases by replacing macroblocks MBm–MBn in slice S1 with macroblocks MBm'–MBn' in the slice that corresponds to slice S1. Step B-(3) will now be explained with reference to the following case in which either one of B-pictures B3, B4 or P-picture P5 contains macroblocks MBm which contains an error.

Figure 9:
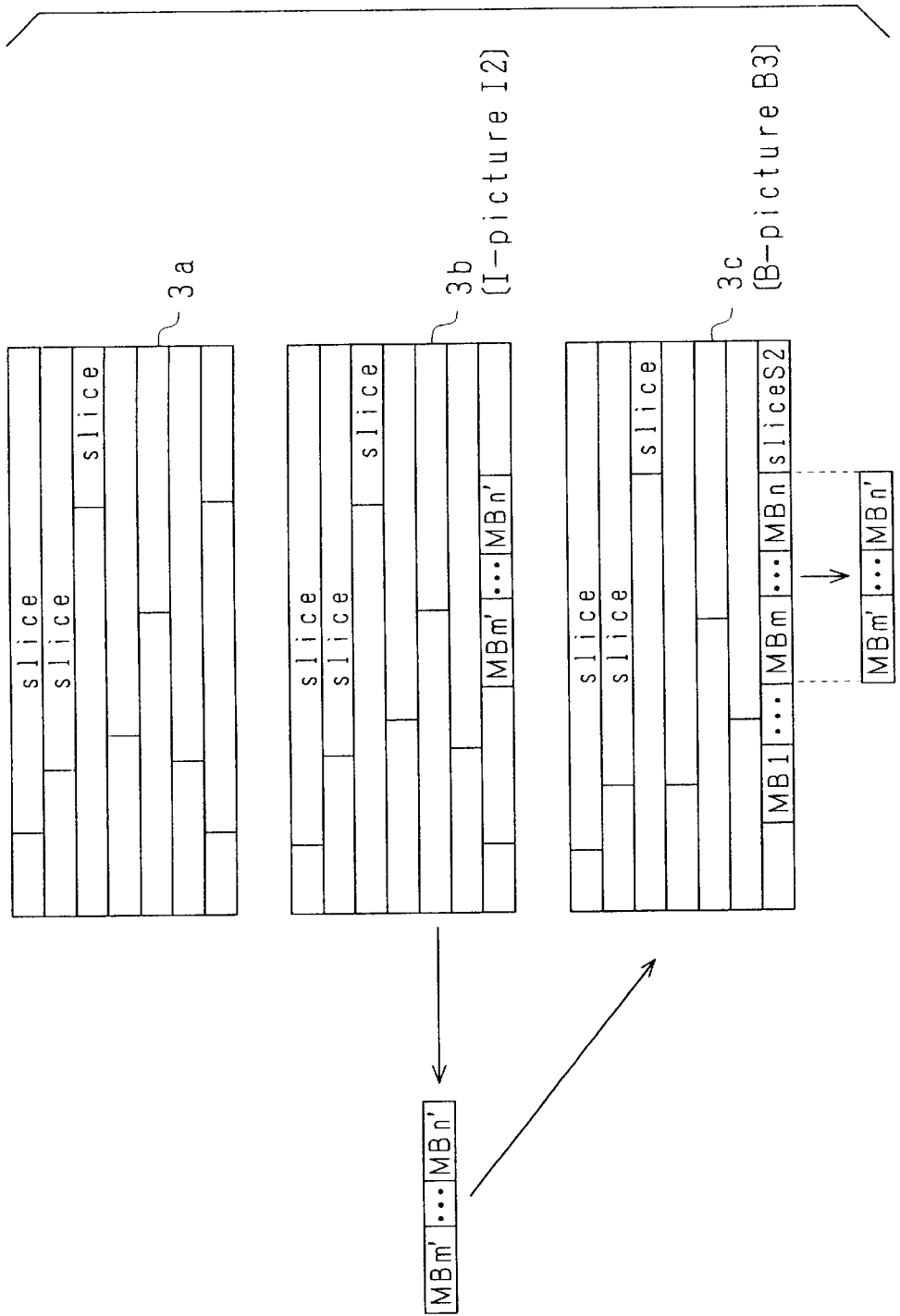
FIGS. 9 through 11 are diagrams showing the process performed at the time a direct current error or a motion area error is detected.

Case B1 (B-picture B3): As shown in FIG. 9, macroblocks MBm' to MBn' of I-picture I2 corresponding to macroblocks MBm to MBn of B-picture B3 are read from backward reference area 3b. Macroblocks MBm'–MBn' are then written to the B-picture storage area 3c. As a result, macroblocks MBm–MBn of B-picture B3 are replaced with macroblocks MBm'–MBn' of the I-picture I2.

Figure 10:
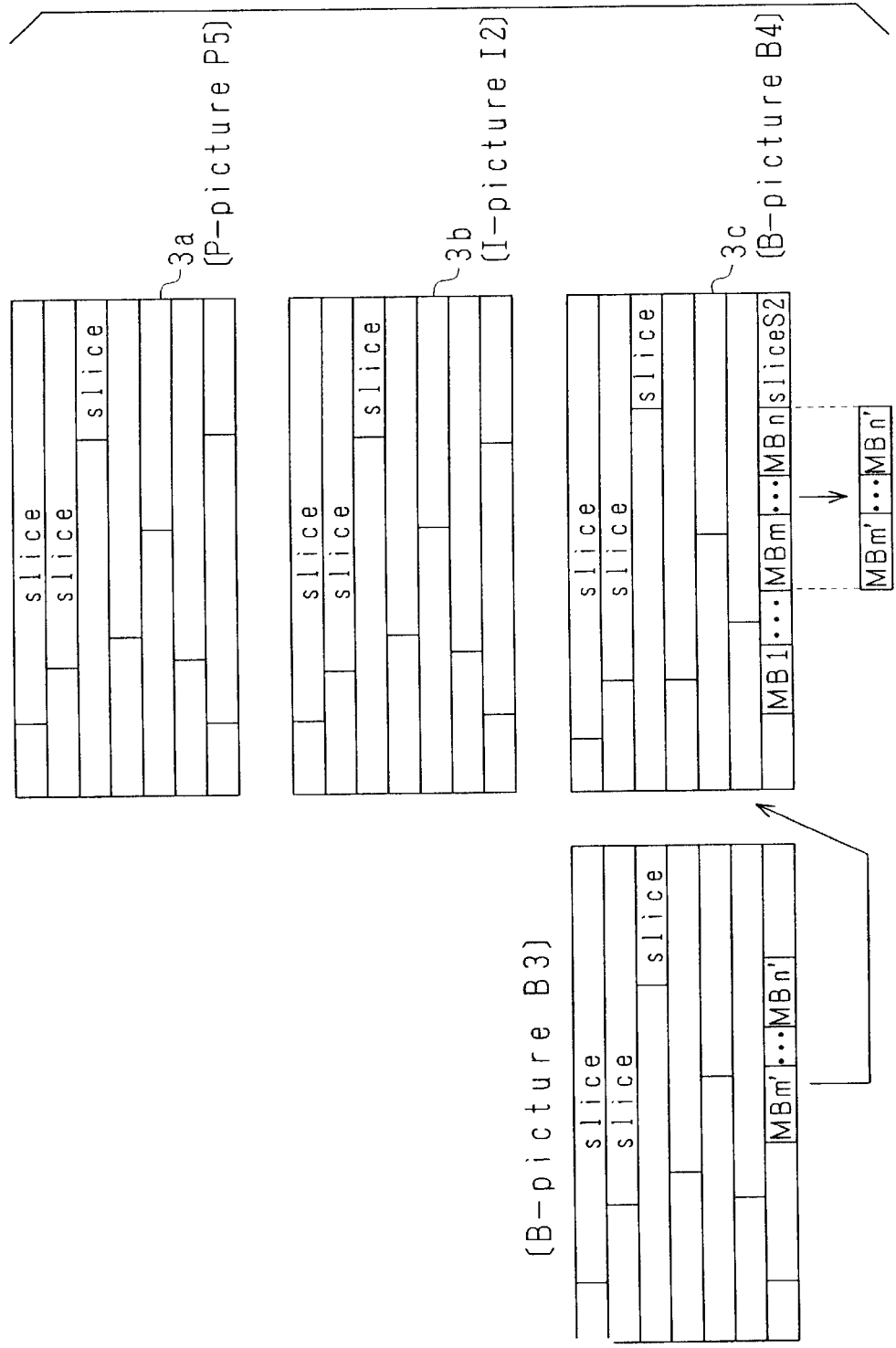

Case B2 (B-picture B4): As shown in FIG. 10, macroblocks MBm' to MBn' of B-picture B3 corresponding to macroblocks MBm to MBn have been previously been stored in area 3c. These macroblocks MBm' to MBn' are not overwritten in the B-picture storage area 3c and remain there. As a result, macroblocks MBm–MBn of B-picture B4 are replaced with macroblocks MBm'–MBn' of B-picture B3.

Figure 11:
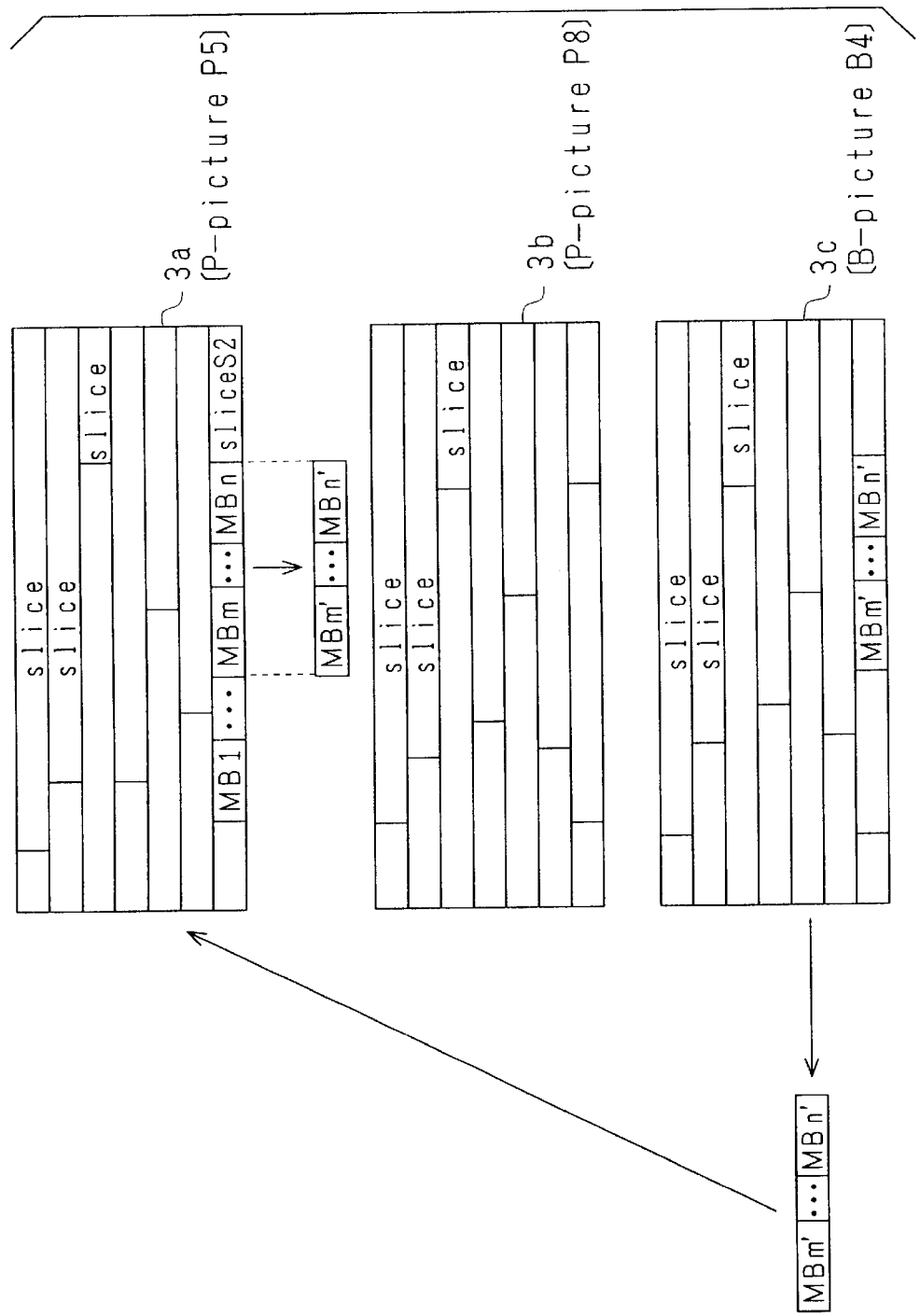

Case B3 (P-picture P5): As shown in FIG. 11, macroblocks MBm' to MBn' of B-picture B4 corresponding to macroblocks MBm to MBn of P-picture P5 are read from area 3a. Then, macroblocks MBm'–MBn' are written to the forward reference area 3a. As a result, macroblocks MBm–MBn of P-picture P5 are replaced with macroblocks MBm'–MBn' of B-picture B4.

The reason why these error steps are performed on macroblocks MBm+1 to MBn as well as on macroblock MBm which actually contains the error is that the next macroblock MBm+1 may contain error. Error detectors 41 and 42 may not detect this error, as explained below.

When an arbitrary bit in a video stream is in error due to some problem with the transmission medium 20, the error is not necessarily confined to that one bit. This situation will be explained with reference to a specific example. In this example, a video stream has been coded using Huffman coding. The fifth bit of the video stream, indicated by (a) "000100101101001 . . . ", is in error as shown in (b) "000110101101001 . . . ". FIG. 12 illustrates this situation. Huffman codes in the Huffman table are as follows.

"11": A
"10": B
"01": C
"001": D
"0001": E
other codes: NG (Not Good)

The correct video stream (a) is expressed as "EDCBBC . . . " by the Huffman codes. The erroneous video stream (b) is expressed as "EBBACD . . . " by the Huffman codes. It should be apparent that a video stream, even if it contains an erroneous bit, will still be able to generate valid Huffman codes.

In this case, the Huffman error detector 13 cannot detect the error and the variable length decoder 6 keeps outputting inaccurate decoded data. Decoded data includes a direct current coefficient and information about motion vectors. Although this decoded data is in error, the direct current error detector 41 and the motion-area error detector 42 cannot detect the error. Therefore, accurate error detection can only be accomplished by performing error processing not only upon macroblock MBm that contains the error, but also upon all macroblocks MBm+1 to MBn that follow macroblock MBm in slice S1.

Figure 13:
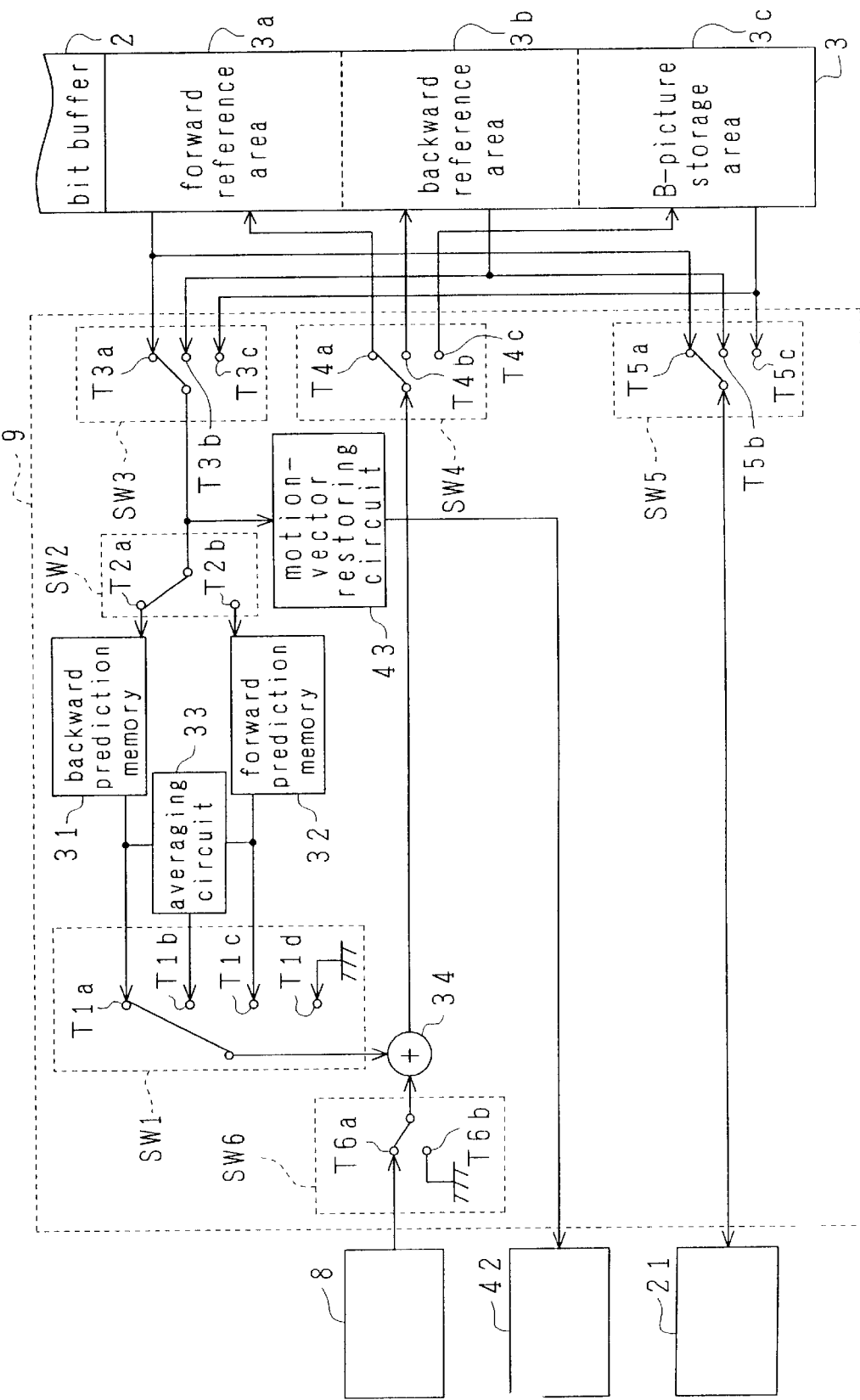
FIG. 13 is a block diagram showing an MC circuit.

FIG. 13 is a block diagram showing the MC circuit 9. This MC circuit 9 includes a backward prediction memory 31, a forward prediction memory 32, an averaging circuit 33, an adder 34, switches SW1 to SW6 and the motion-vector restoring circuit 43.

Switch SW6 has a contact T6a connected to the output terminal of the IDCT circuit 8, and a contact T6b connected to ground as a low-potential power supply. Switch SW6 selectively switches couples the contact T6a or T6b to the first input terminal of the adder 34. Switch SW1 has a contact T1a connected to the output terminal of the backward prediction memory 31, a contact T1b connected to the output terminal of the averaging circuit 33, a contact T1c connected to the output terminal of the forward prediction memory 32, and a contact T1d connected to ground. Switch SW1 selectively couples one of the contacts T1a to T1d to the second input terminal of the adder 34. Switch SW2 has a contact T2a connected to the input terminal of the backward prediction memory 31, and a contact T2b connected to the input terminal of the forward prediction memory 32, and selectively switches contact T2a or T2b to switch SW3.

Switch SW3 has a contact T3a connected to the output terminal of the forward reference area 3a and also connected to a contact T5a of switch SW5, a contact T3b connected to the output terminal of the backward reference area 3b and also connected to a contact T5b of switch SW5, and a contact T3c connected to the output terminal of the B-picture storage area 3c and also connected to a contact T5c of switch SW5. Switch SW5 selectively couples one of the contacts T5a to T5c to the display 21. Switch SW4 has a contact T4a connected to the input terminal of the forward reference area 3a, a contact T4b connected to the input terminal of the backward reference area 3b, and a contact T4c connected to the input terminal of the B-picture storage area 3c. Switch SW4 selectively couples one of the contacts T4a to T4c to the output terminal of the adder 34.

The backward prediction memory 31 and the forward prediction memory 32 each store one macroblock of data. The averaging circuit 33 averages data read from the backward prediction memory 31 and the forward prediction memory 32. The motion-vector restoring circuit 43 receives one macroblock of data read from one of the individual areas 3a to 3c via switch SW3 and restores the motion vectors of that macroblock.

Normal Operation

A description will now be given of the normal operation of the MPEG video decoder 1 in which none of the error detectors 13, 41 or 42 has detected an error. The control core circuit 12 controls the switching of switch SW6 to the contact T6a, and controls the switching of other switches SW1–SW5 in accordance with the decoded data of I-picture, P-picture or B-picture output from the IDCT circuit 8.

Case C1 (I-picture): The adder 34 outputs the same data (i.e. intra-frame prediction frame macroblock) as received from the IDCT circuit 8, and this data is stored via switch SW4 into the forward reference area 3a or the backward reference area 3b.

At this time, switch SW1 is set to the contact T1d and switch SW4 is set to the contact T4a or the contact T4b. Switch SW5 selectively switches the contacts T5a–T5c in accordance with the setting of switch SW4. When switch SW4 is set to the contact T4a, for example, switch SW5 is set to the contact T5b or the contact T5c. Each of switches SW2 and SW3 may be set to any of its contacts.

Case C2 (P-picture): Switch SW1 is selectively set to the contact T1c or the contact T1d in accordance with macroblock type. There are two types of macroblocks in a P-picture: an intra-frame prediction frame macroblock (intra-macroblock) and a forward prediction frame macroblock (forward inter-macroblock).

Case C2-<1> (Intra-macroblock): The same as for case C1 above.

Case C2-<2> (Forward inter-macroblock): One macroblock of data read from the area 3b is stored in the forward prediction memory 32, and the adder 34 adds this macroblock of data and the output data of the IDCT circuit 8. The resultant data is stored via switch SW4 into the area 3a or the area 3b. At this time, switches SW2 and SW3 are respectively set to the contacts T2b and T3b, switch SW1 is set to the contact T1c, and switch SW4 is set to the contact T4a or the contact T4b. Switch SW5 is selectively set to one of the contacts T5a–T5c in accordance with the setting of switch SW4.

Case C3 (B-picture): The output data of the adder 34 is stored via switch SW4 into the B-picture storage area 3c. At this time, switch SW1 is selectively set to one of the contacts T1a–T1d in accordance with macroblock type. Switches SW4 and SW5 are respectively set to the contacts T4c and T5c. The types of macroblocks in a B-picture further include a backward prediction frame macroblock (backward inter-macroblock) and an interpolative prediction frame macroblock (interpolative macroblock) in addition to the previously discussed intra-macroblock and a forward inter-macroblock.

Case C3-<1> (Intra-macroblock): The adder 34 outputs the same data as received from the IDCT circuit 8. At this time, switch SW1 is set to the contact T1d. Each of switches SW2 and SW3 may be set to any of its contacts.

Case C3-<2> (Forward inter-macroblock): One macroblock of data read from the area 3b is stored in the forward prediction memory 32, as in the case C2-<2>. The adder 34 adds this macroblock of data read from the memory 32 and the output data of the IDCT circuit 8. At this time, switch SW1 is set to the contact T1c.

Case C3-<3> (Backward inter-macroblock) : One macroblock of data read from the area 3a is stored in the backward prediction memory 31. The adder 34 adds this macroblock of data read from the memory 31 and the output data of the IDCT circuit 8. At this time, switches SW2 and SW3 are respectively set to the contacts T2a and T3a, and switch SW1 is set to the contact T1a.

Case C3-<4> (Interpolative macroblock): One macroblock of data read from the area 3b is stored in the forward prediction memory 32, and then one macroblock of data read from the area 3a is stored in the backward prediction memory 31. The averaging circuit 33 averages the data read from the memories 31 and 32. The adder 34 adds the output data of the averaging circuit 33 and the output data of the IDCT circuit 8. At this time, switches SW2 and SW3 are respectively first set to the contacts T2b and T3b first, and are then respectively set to the contacts T2a and T3a. Switch SW1 is set to the contact T1b.

Error Processing Operation

A description will now be given of the error processing operation of the MPEG video decoder 1 in the case where one of the error detectors 13, 41 and 42 has detected an error. The control core circuit 12 controls the switching of switches SW2 and SW3 in order to read one macroblock of data from one of the areas 3a–3c and to store the data into the backward prediction memory 31. Furthermore, the control core circuit 12 controls the switching of switches SW1, SW5 and SW6 in order to allow the adder 34 to output the same data as macroblock data read from the memory 31 and to selectively send the data to one of the areas 3a–3c. The forward prediction memory 32 may be used instead of the backward prediction memory 31.

(I) Processing operation in detection of Huffman-error

The following description will be given based on the above-described cases A1 to A3 on the assumption that slice S1 contains an error. Slice S1 has n macroblocks MB1 to MBn in a video stream with the data structure as shown in FIG. 4. In these cases, switch SW6 is switched to the contact T6b.

Case A1 (B-picture B3 (see FIG. 5)): The data of macroblock MB1' read from the backward reference area 3b is stored in the backward prediction memory 31 via switches SW2 and SW3. The data of macroblock MB1' read from the memory 31 is then transferred via the adder 34 to the B-picture storage area 3c. This error processing is repeated for macroblocks MB2' to MBn', thereby replacing slice S1 of B-picture B3 with macroblocks MB1'–MBn' of I-picture I2. At this time, switch SW4 is set to the contact T4c which corresponds to the area 3c, and switch SW3 is set to the contact T3b which corresponds to the area 3b. When the memory 32 is used instead of the memory 31, switch SW2 is set to the contact T2b and switch SW1 is set to the contact T1c.

Case A2 (B-picture B4 (see FIG. 6)) The data of macroblock MB1' read from the area 3c is stored in the memory 31 via switches SW2 and SW3. The data of macroblock MB1' read from the memory 31 is then transferred via the adder 34 to the area 3c. Consequently, the data of macroblock MB1' is not overwritten with the data of B-picture B4 but remains in the area 3c. This error processing is repeated for macroblocks MB2' to MBn', thereby replacing slice S1 of B-picture B4 with macroblocks MB1'–MBn' of B-picture B3. At this time, switch SW4 is set to the contact T4c which corresponds to the area 3c, and switch SW3 is set to the contact T4c which corresponds to the area 3c.

Case A3 (P-picture P5 (see FIG. 7)): The data of macroblock MB1' read from the area 3c is stored in the memory 31 via switches SW2 and SW3. The data of macroblock MB1' read from the memory 31 is then transferred via the adder 34 to the area 3a. This error processing is repeated for macroblocks MB2' to MBn', thereby replacing slice S1 of P-picture P5 with macroblocks MB1'–MBn' of B-picture B4. At this time, switch SW4 is set to the contact T4a which corresponds to the area 3a, and switch SW3 is set to the contact T3c which corresponds to the area 3c.

(II) Processing operation in detection of direct current error or motion-area error The following description will be given based on the above-described cases B1 to B3 on the assumption macroblock MBm contains an error. Macroblock Mbm is in slice S1 in a video stream with the data structure as shown in FIG. 4.

Case B1 (B-picture B3 (see FIG. 9)): The data of macroblock MBm' read from the area 3b is stored in the memory 31 via switches SW2 and SW3. The data of macroblock MBm' read from the memory 31 is then transferred via the adder 34 to the area 3c. This error processing is repeated for macroblocks MBm+1' to MBn', thereby replacing macroblocks MBm—MBn of B-picture B3 with macroblocks MBm'–MBn' of I-picture I2. At this time, switch SW4 is set to the contact T4c which corresponds to the area 3c, and switch SW3 is set to the contact T3b which corresponds to the area 3b.

Case B2 (B-picture B4 (see FIG. 10)): The data of macroblock MBm' read from the area 3c is stored in the memory 31 via switches SW2 and SW3. The data of macroblock MBm' read from the memory 31 is then transferred via the adder 34 to the area 3c. Consequently, the data of macroblock MBm' is not overwritten with the data of B-picture B4 but remains in the area 3c. This error processing is repeated for macroblocks MBm+1' to MBn', thereby replacing macroblocks MBm–MBn of B-picture B4 with macroblocks MBm'–MBn' of the B-picture B3. At this time, switch SW4 is set to the contact T4c which corresponds to the area 3c, and switch SW3 is set to the contact T3c which corresponds to the area 3c.

Case B3 (P-picture P5 (see FIG. 11)): The data of macroblock MBm' read from the area 3c is stored in the memory 31 via switches SW2 and SW3. The data of macroblock MBm' read from the memory 31 is then transferred via the adder 34 to the area 3a. This error processing is repeated for macroblocks MBm+1' to MBn', thereby replacing macroblocks MBm–MBn of P-picture P5 with macroblocks MBm'–MBn' of B-picture B4. At this time, switch SW4 is set to the contact T4a which corresponds to the area 3a, and switch SW3 is set to the contact T3c which corresponds to the area 3c.

Although only one embodiment of the present invention has been described herein, it should be apparent to those skilled in the art that the present invention may be embodied in many other specific forms without departing from the spirit or scope of the invention. Particularly, it should be understood that this invention may be embodied in the following forms.

One of the error detectors 13, 41 and 42 may be omitted. Alternatively, the Huffman error detector 13 may be omitted and only one of the error detectors 41 and 42 may be provided.

The signal processing done by the individual circuits 4–9, 12, 13, 41 and 42 may be accomplished by software-based signal processing that is performed by a CPU.

Therefore, the present examples and embodiment are to be considered as illustrative and not restrictive and the invention is not to be limited to the details given herein, but may be modified within the scope of the appended claims.

What is claimed is:

1. A video decoding apparatus for decoding encoded video data to continuously produce decoded pictures, said encoded video data including a series of pictures, with each picture including a plurality of slices, and each slice including a plurality of macroblocks, said video decoding apparatus comprising:

a dequantizer for performing dequantization on said encoded video data to produce dequantized data based on a quantization threshold value;

a first error detector for checking whether each of said slices of each of said pictures includes an erroneous macroblock, based on said dequantized data, said first error detector performs the checking macroblock by macroblock; and an error processing circuit for replacing an erroneous macroblock with a preceding correct macroblock, wherein when a check target slice in a picture currently undergoing decoding includes an erroneous macroblock, said error processing circuit replaces said erroneous macroblock with a preceding correct macroblock, said preceding correct macroblock included in a preceding picture to be output from said video decoding apparatus prior to said picture currently undergoing decoding, and wherein a position of said preceding correct macroblock in said preceding picture corresponds to a position of said erroneous macroblock in said picture currently undergoing decoding.

2. The video decoding apparatus according to claim 1, wherein said error processing circuit replaces a first group of macroblocks including said erroneous macroblock and a plurality of macroblocks chronologically following said erroneous macroblock in said check target slice, with a second group of macroblocks including said preceding correct macroblock and a plurality of macroblocks chronologically following said preceding correct macroblock in a slice positionally corresponding to said check target slice.

3. The video decoding apparatus according to claim 1, wherein said dequantizer performs dequantization on said video data to produce discrete cosine transform coefficient data as said dequantized data, said dequantized data being produced macroblock by macroblock, and wherein said first error detector determines, macroblock by macroblock, whether a direct current coefficient included in said discrete cosine transform coefficient data lies within a predetermined range, and determines a macroblock which is associated with a direct current coefficient lying outside of said predetermined range as an erroneous macroblock.

4. The video decoding apparatus according to claim 1, further comprising:

a variable length decoder for performing variable length decoding on said video data using Huffman codes and supplying variable-length decoded data to said dequantizer; and a second error detector for checking whether each of said slices of said each picture contains an error, based on said variable-length decoded data, wherein when said check target slice in said picture currently undergoing decoding is in error, said error processing circuit replaces said check target slice with a preceding correct slice, said preceding correct slice included in said preceding picture, a position of said preceding correct slice in said preceding picture corresponds to a position of said check target slice in said picture currently undergoing decoding.

5. The video decoding apparatus according to claim 4, further comprising a memory for storing a Huffman table indicating said Huffman codes, and wherein said second error detector determines whether data of each of said slices corresponds to Huffman codes in said Huffman table and also determines whether current variable-length decoded data for a current check target slice is consistent with old variable-length decoded data and identifies a macroblock as erroneous if said data of each of said slices does not correspond to said Huffman codes or if said current variable-length decoded data is inconsistent with said old variable-length decoded data.

6. The video decoding apparatus according to claim 4, further comprising:

a motion-vector restoring circuit for restoring data of a motion vector for each of said macroblocks; and a third error detector for checking whether each of said slices of said each picture includes an erroneous macroblock based on said restored motion vector data, said third error detector performs the checking macroblock by macroblock.

7. The video decoding apparatus according to claim 6, wherein said third error detector determines whether said restored motion vector data indicates a point inside or outside a picture, and identifies a macroblock corresponding to a motion vector indicating a point outside a picture as an erroneous macroblock.

8. The video decoding apparatus according to claim 1, further comprising:

a motion-vector restoring circuit for restoring data of a motion vector for each of said macroblocks; and a second error detector for checking whether each of said slices of said each picture includes an erroneous macroblock based on said restored motion vector data, said second error detector performs the checking macroblock by macroblock.

9. The video decoding apparatus according to claim 8, wherein said second error detector determines whether said restored motion vector indicates a point inside or outside a picture, and identifies a macroblock corresponding to a motion vector indicating a point outside a picture as an erroneous macroblock.

10. A video decoding apparatus for decoding encoded video data to continuously produce decoded pictures, said encoded video data including a series of pictures, with each picture including a plurality of slices, and each slice including a plurality of macroblocks, said video decoding apparatus comprising:

a motion-vector restoring circuit for restoring data of a motion vector for each of said macroblocks;

an error detector for checking whether each of said slices of said each picture includes an erroneous macroblock based on said restored motion vector data, said error detector performs the checking macroblock by macroblock; and an error processing circuit for replacing an erroneous macroblock with a preceding correct macroblock, wherein when a check target slice in a picture currently undergoing decoding includes an erroneous macroblock, said error processing circuit replaces said erroneous macroblock with a preceding correct macroblock, said preceding correct macroblock included in a preceding picture to be output from said video decoding apparatus prior to said picture currently undergoing decoding, and wherein a position of said preceding correct macroblock in said preceding picture corresponds to a position of said erroneous macroblock in said picture currently undergoing decoding.

11. The video decoding apparatus according to claim 10, wherein said error detector determines whether said restored motion vector data indicates a point inside or outside a picture, and identifies a macroblock corresponding to a motion vector indicating a point outside a picture as an erroneous macroblock.

12. The video decoding apparatus according to claim 10, wherein said error processing circuit replaces a first group of macroblocks including said erroneous macroblock and a plurality of macroblocks chronologically following said erroneous macroblock in said check target slice, with a second group of macroblocks including said preceding correct macroblock and a plurality of macroblocks chronologically following said preceding correct macroblock in a slice positionally corresponding to said check target slice.

13. A video decoding apparatus for decoding an encoded video bit stream to continuously produce decoded pictures, said encoded video bit stream including a series of pictures, with each picture including a plurality of slices, and each slice including a plurality of macroblocks, said video decoding apparatus comprising:

a slice header detector for detecting a slice header affixed at a head of each of said slices;

a variable length decoder for performing variable length decoding on said video bit stream based on Huffman codes, said variable length decoder supplying variable-length decoded data;

a dequantizer for performing dequantization on said variable-length decoded data based on a quantization threshold value to produce discrete cosine transform coefficient data;

an inverse discrete cosine transform circuit for performing an inverse discrete cosine transform on said discrete cosine transform coefficient data;

a motion compensated prediction circuit for performing motion compensated prediction based on a processing result from said inverse discrete cosine transform circuit to produce said decoded pictures;

a frame buffer for temporarily storing said produced decoded pictures, said motion compensated prediction circuit performing motion compensated prediction using said decoded pictures stored in said frame buffer;

a first error detector for checking whether each of said slices of each of said pictures includes an erroneous macroblock based on said discrete cosine transform coefficient data produced by said dequantizer, said first error detector performs the checking macroblock by macroblock; and an error processing circuit for replacing an erroneous macroblock with a preceding correct macroblock using a slice header detected by said slice header detector, wherein when a check target slice in a picture currently undergoing decoding includes an erroneous macroblock, said error processing circuit replaces said erroneous macroblock with a preceding correct macroblock, said preceding correct macroblock included in a preceding decoded picture to be output from said frame buffer prior to said picture currently undergoing decoding, and wherein a position of said preceding correct macroblock in said preceding decoded picture corresponds to a position of said erroneous macroblock in said picture currently undergoing decoding.

14. The video decoding apparatus according to claim 13, wherein said error processing circuit replaces a first group of macroblocks including said erroneous macroblock and a plurality of macroblocks chronologically following said erroneous macroblock in said check target slice, with a second group of macroblocks including said preceding correct macroblock and a plurality of macroblocks chronologically following said preceding correct macroblock in a slice positionally corresponding to said check target slice.

15. The video decoding apparatus according to claim 14, wherein said error processing circuit inhibits operation of said variable length decoder, said dequantizer and said inverse discrete cosine transform circuit on said check target slice which includes said erroneous macroblock and invalidates processing results, and restarts operation of said variable length decoder, said dequantizer and said inverse discrete cosine transform circuit for a slice chronologically following said check target slice using a slice header detected by said slice header detector.

16. The video decoding apparatus according to claim 13, wherein said first error detector determines, macroblock by macroblock, whether a direct current coefficient included in said discrete cosine transform coefficient data lies within a predetermined range, and identifies a macroblock which produces a direct current coefficient lying outside said predetermined range as an erroneous macroblock.

17. The video decoding apparatus according to claim 13, further comprising a second error detector for checking whether each of said slices of said each picture contains an error, based on said variable-length decoded data, wherein when said check target slice in said picture currently undergoing decoding is in error, said error processing circuit replaces said check target slice with a preceding correct slice, said preceding correct slice included in said preceding decoded picture, and wherein a position of said preceding correct slice in said preceding decoded picture corresponds to a position of said check target slice in said picture currently undergoing decoding.

18. The video decoding apparatus according to claim 17, wherein said second error detector determines whether data of each of said slices corresponds to Huffman codes in a Huffman table and also determines whether variable-length decoded data for a current check target slice is consistent with old variable-length decoded data and identifies a macroblock as erroneous if said data of each of said slices does not correspond to said Huffman codes or if said variable-length decoded data is inconsistent with said old variable-length decoded data.

19. The video decoding apparatus according to claim 18, wherein said error processing circuit inhibits operation of said variable length decoder on said check target slice which includes said erroneous macroblock, invalidates said variable-length decoded data for said check target slice, and restarts operation of said variable length decoder for a slice chronologically following said check target slice using a slice header detected by said slice header detector.

20. The video decoding apparatus according to claim 17, wherein said motion compensated prediction circuit includes a motion-vector restoring circuit for restoring data of a motion vector for each of said macroblocks; and said video decoding apparatus further comprising a third error detector for checking whether each of said slices of each of said pictures includes an erroneous macroblock based on said restored motion vector data, said third error detector performs the checking macroblock by macroblock.

21. The video decoding apparatus according to claim 20, wherein said third error detector determines whether said restored motion vector indicates a point inside or outside a picture, and identifies a macroblock corresponding to a motion vector indicating a point outside a picture as an erroneous macroblock.

22. The video decoding apparatus according to claim 13, wherein said motion compensated prediction circuit includes a motion-vector restoring circuit for restoring data of a motion vector for each of said macroblocks; and said video decoding apparatus further comprising a second error detector for checking whether each of said slices of each of said pictures includes an erroneous macroblock based on said restored motion vector data, said second error detector performs the checking macroblock by macroblock.

23. The video decoding apparatus according to claim 22, wherein said second error detector determines whether said restored motion vector indicates a point inside or outside a picture, and identifies a macroblock corresponding to a motion vector indicating a point outside a picture as an erroneous macroblock.

\* \* \* \* \*